UNITED STATES PATENT OFFICE.

HENRY J. BOUGHTON, OF ALBANY, OREGON.

MEDICINAL COMPOUND.

SPECIFICATION forming part of Letters Patent No. 233,063, dated October 12, 1880.

Application filed June 30, 1880. (No specimen.)

*To all whom it may concern:*

Be it known that I, HENRY JEROME BOUGHTON, of the city of Albany, in the county of Linn and State of Oregon, have invented a new and useful Composition of Matter.

I claim as my invention the plan of imitating the processes of nature by combining the natural inorganic elements that exist in healthy blood together in a compound, powder, pill, or solution, for the purpose of using the same as a curative agent in any and all diseases or abnormal conditions, where the blood from any cause is in an unhealthy condition in consequence of having lost some one or more of the natural inorganic proximate principles, substantially as herein set forth, of which the following is a clear description.

My composition consists of the following ingredients combined in the following proportions stated—viz: Phosphate of lime, one-fourth of a grain; chloride of sodium, one-fourth of a grain; phosphate of potassa, one-fourth of a grain; sulphate of potassa, one-fourth of a grain; iodide of potassa, one-fourth of a grain; iodide of iron, one-fourth of a grain; phosphate of soda, one-fourth of a grain; sulphate of soda, one-fourth of a grain; water, two-thirds of a table-spoonful; sirup of orange, one-third of a table-spoonful.

Any other simple flavoring or vehicle may be used instead of the orange-sirup.

The above proportions, taken together, are intended for a single dose, to be repeated three or four times daily. The dose may be increased to five grains, or more, of each, three or more times daily.

The tonic properties of iron in the system are about the same with nearly all the different preparations. For this reason I select the iodide of iron, because of its ready solubility and peculiar tonic properties. The remainder of the inorganic ingredients above named comprises the most important of the natural inorganic elements within the body.

I secure in this my invention a composition of matter which, taken together, exactly imitates the composition of the human body by supplying the system with those elements or inorganic proximate principles which always exist in the blood in health, and which is governed, in its adaptation to the wants of the body, by a perfectly natural law. No exactness of dose is required other than that stated, because the blood distributes to each tissue its own special pabulum, which is different from that required by every other tissue, and all excess not required to maintain healthy nutrition is discharged from the body through the excretory functions—namely, the bowels, the kidneys, the skin, and the lungs.

I am aware that these elements have been used separately for different medicinal purposes, but not as a whole together, as herein designed.

Having thus described my invention, I claim—

A medical compound consisting of phosphate of lime, chloride of sodium, phosphate of potassa, sulphate of potassa, iodide of potassa, iodide of iron, phosphate of soda, sulphate of soda, water, and sirup of orange, substantially in the proportions and for the purpose specified.

HENRY JEROME BOUGHTON.

Witnesses:
 J. H. HACKLEMAN,
 S. C. DICKEY.